April 14, 1970     T. J. O'CONNOR     3,506,800
QUICK-CHANGE TOOL FOR ELECTROEROSIVE MACHINING
Original Filed June 20, 1966     2 Sheets-Sheet 1
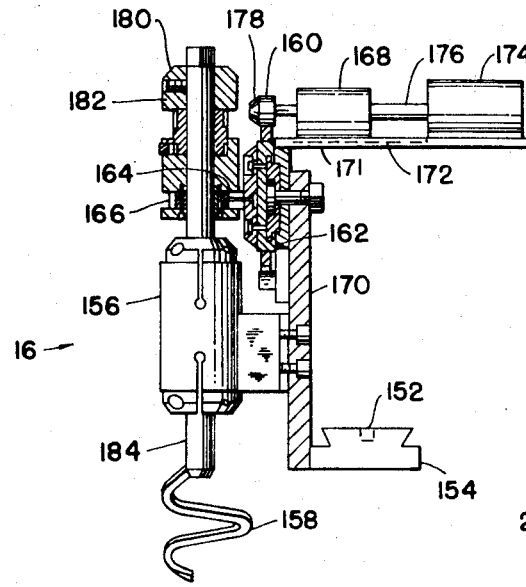
FIG.4
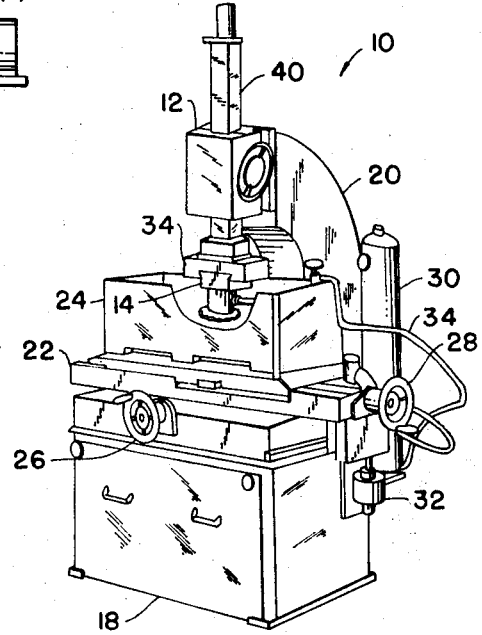
FIG.1
FIG.2
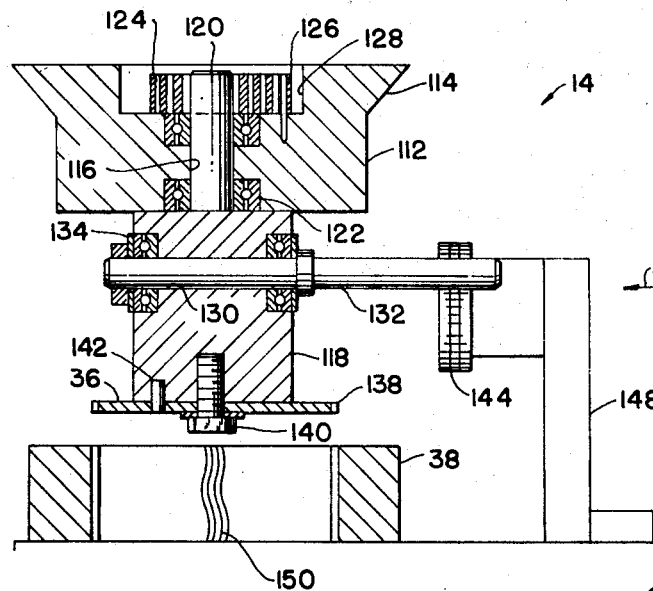
FIG.3
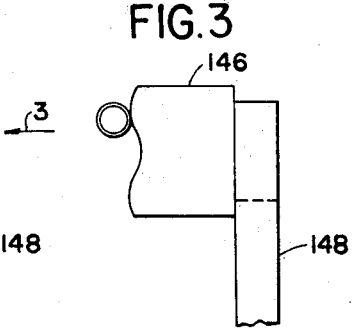
INVENTOR
THOMAS J. O'CONNOR
BY Whittemore, Halbert & Belknap
ATTORNEYS April 14, 1970   T. J. O'CONNOR   3,506,800
QUICK-CHANGE TOOL FOR ELECTROEROSIVE MACHINING
Original Filed June 20, 1966   2 Sheets-Sheet 2
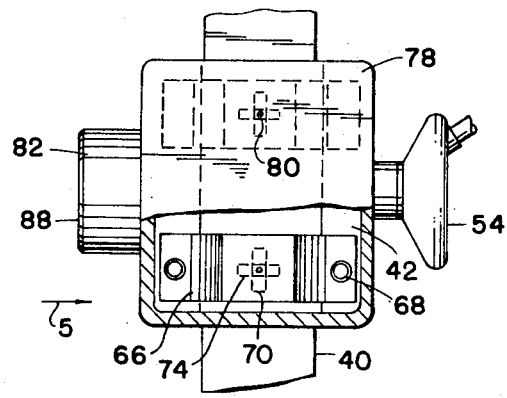
FIG.5
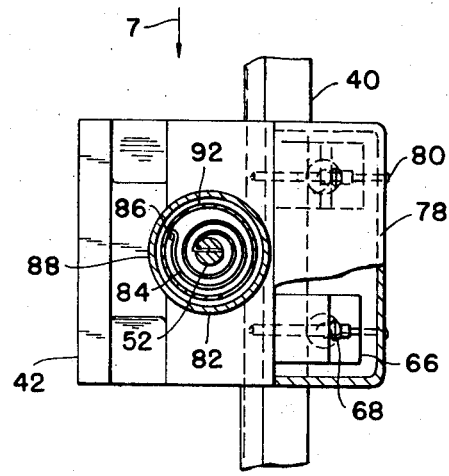
FIG.6
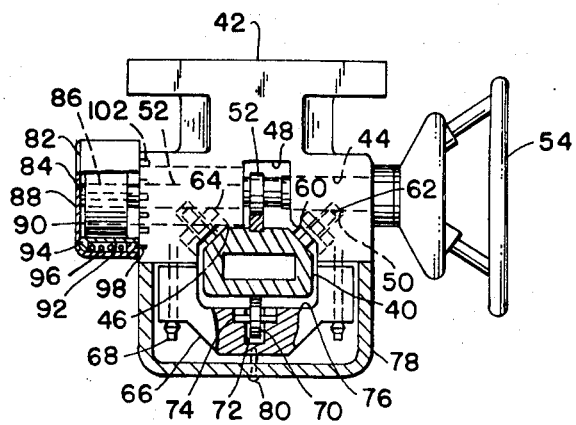
FIG.7
FIG.8
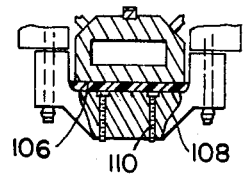
INVENTOR
THOMAS J. O'CONNOR
BY Whittemore, Hulbert & Belknap
ATTORNEYS

United States Patent Office 3,506,800
Patented Apr. 14, 1970

3,506,800
QUICK-CHANGE TOOL FOR ELECTROEROSIVE MACHINING
Thomas J. O'Connor, 100 Morgan Road,
Ann Arbor, Mich. 48104
Original application June 20, 1966, Ser. No. 558,695.
Divided and this application Jan. 8, 1968, Ser.
No. 696,280
Int. Cl. B23k 7/02
U.S. Cl. 219—69                                                   8 Claims

ABSTRACT OF THE DISCLOSURE

A quick-change tool for use in electrical machining of arcuate grooves or holes in conductive workpieces in conjunction with electrical machining apparatus is disclosed. The quick-change tool includes a dovetail base plate portion for rapidly and accurately securing the tool to electrical machining apparatus.

In one embodiment the quick-change tool includes a cylindrical body member having a disc electrode secured to one end thereof which body member is mounted for rotation about its axis of generation at the other end. A cam follower shaft extends transversely from the body member biased into engagement with a vertically extending cam surface whereby on downward movement of the body member the electrode will rotate in accordance with the cam surface to machine axially arcuate interior grooves in a cylindrical workpiece.

In another embodiment the quick-change tool includes structure for moving a helical electrode axially while simultaneously rotating the helical electrode to produce a helical opening in a conducting workpiece. The second embodiment of the quick-change tool may also be used to provide linear eroding of a workpiece with a continuously rotated electrode.

In addition unique ram structure for electrical machining apparatus is disclosed including a vertically movable ram guided in one modification by triangular three point roller adjustable guide structure at spaced apart locations therealong whereby the vertical axis of the ram may be readily adjusted and ram guide wear compensated for. In a second modification of the ram structure, two point roller and a friction surface guiding of the ram is provided. Adjustable counterbalance means is also provided for the ram structure comprising an adjustable helical coil connected between the ram and guide means therefor operable to wind up on downward movement of the ram.

CROSS-REFERENCE TO RELATED APPLICATIONS

This application is a division of application Ser. No. 558,695, filed June 20, 1966, which is a continuation-in-part of application Ser. No. 504,971, filed Oct. 24, 1965, now Patent No. 3,363,083, which in turn is a continuation-in-part of application Ser. No. 250,321, filed Jan. 9, 1963, now Patent No. 3,22,494.

BACKGROUND OF THE INVENTION

Field of the invention

The invention relates to electrical machining of conductive workpieces and refers more specifically to a quick-change tool for use with electrical machining apparatus in machining arcuate paths in conductive workpieces including spiral openings and axially arcuate grooves and unique ram structure for electrical machining apparatus including means for adjusting the ram axis, compensating for ram wear and counterbalancing the ram in use.

Description of the prior art

In the past it has been difficult or impossible to machine spiral openings. In addition it has been particularly difficult to machine other arcuate forms in workpieces, such as longitudinal arcuate grooves in cylindrical workpieces. Conventional machining methods, and in the past even electrical machining apparatus and methods, have not been suited to such machining. Spiral paths and the like where they have been produced in the past have been cast and/or produced by separately machining parts of the desired path in separate workpieces and subsequently connecting the workpieces together to form the desired path configuration. Such past procedures are unsatisfactory in that the resulting product has not been as accurate as desirable and without parting lines and the like.

In addition, prior ram structure for electrical machining apparatus and the like has usually included bearing, ram guides and been without counterbalancing means. Thus, with prior structures adjusting of the vertical axis of the ram has been substantially impossible and no means have been provided for taking up the normal wear between the ram structure and guide means therefor. Also, the servo drive for the ram structure has had to work against the full weight of the ram in one direction which is undesirable.

SUMMARY OF THE INVENTION

The quick-change tool structure of the invention permits ready machining of arcuate paths in conductive workpieces. Thus, in one embodiment means are provided for moving a disc electrode toward a cylindrical workpiece, while rotating the electrode in accordance with a predetermined cam surface to machine internal, axially arcuate, grooves in the cylindrical workpiece. In another embodiment means are provided for simultaneously axially driving a spiral electrode and rotating the electrode to machine a spiral opening through a conducting workpiece.

The ram structure provided in accordance with the invention includes three point guide means at axially spaced apart locations along the length of a ram whereby the vertical axis of the ram may be rapidly and accurately adjusted and wear between the guide means and the ram compensated for. In addition, adjustable counterbalancing structure for the ram is provided.

BRIEF DESCRIPTION OF THE DRAWINGS

FIGURE 1 is a perspective view of electrical machining apparatus having ram structure constructed in accordance with the invention to which a quick-change tool for machining an arcuate path in a conductive workpiece constructed in accordance with the invention is secured.

FIGURE 2 is an enlarged longitudinal section view of the quick-change tool illustrated in FIGURE 1.

FIGURE 3 is a partial elevation view of the quick-change tool illustrated in FIGURE 1 taken in the direction of arrow 3 in FIGURE 2.

FIGURE 4 is a partly broken away, elevation view of another embodiment of the quick-change tool for machining an arcuate path in a conductive workpiece constructed in accordance with the invention.

FIGURE 5 is an enlarged partly broken away front view of the ram structure of the electrical machining apparatus illustrated in FIGURE 1.

FIGURE 6 is a partly broken away side view of the ram structure illustrated in FIGURE 1 taken in the direction of arrow 6 in FIGURE 5.

FIGURE 7 is a partly broken away top view of the ram guide structure illustrated in FIGURE 1 taken in the direction of arrow 7 in FIGURE 6.

FIGURE 8 is a partial section view of modified ram structure similar to the view of the ram structure similar to the view of the ram structure illustrated in FIGURE 7.

DESCRIPTION OF THE PREFERRED EMBODIMENTS

The electrical discharge machining apparatus mechanical section 10 illustrated in FIGURE 1 is a mechanical section for electrical discharge machining of conductive workpieces and includes ram structure 12. As shown in FIGURE 1, the quick-change electrode supporting tool 14 is supported from the ram structure 12. The quick-change tool 14 may similarly be supported from the ram structure 12.

More specifically the electrical discharge machining apparatus mechanical section 10 includes a base 18, a frame 20 supporting the ram structure 12 and table 22 positioned on base 18. The dielectric tank 24 is movable in a horizontal plane on perpendicular axis on rotation of cranks 26 and 28 in conjunction with ball nut and screw structures operable between the base 18 and table 22 and between the table 22 and tank 24, as will be understood by those in the art. A dielectric filter 30 and pump 32 are included with the mechanical section 10, along with the connecting apparatus 34 to provide dielectric as required in the dielectric tank 24 to facilitate electrical discharge machining.

Complete electrical discharge machining apparatus would include means for supplying pulsed direct current electrical energy between an electrode 36 held by the tool 14 and a workpiece 38 and a servo motor drive system for the ram structure 12 connected to move the ram 40 in accordance with the spark gap between the electrode 36 and workpiece 38, as will be understood by those in the art.

Since such power supplies and servomotor drive systems are well known they will not be considered in detail at this time. For details of such power supplies and drive systems reference is made to the cross-reference patent applications and patent and the references cited therein.

The ram structure 12 illustrated best in FIGURES 5 through 8 includes a base 42 which may be secured to the frame 20 by convenient means, such as bolts (not shown). The base 42 has an opening 44 extending therethrough and a recess 46 in one side thereof having the separate pockets 48 and 50 therein, as best shown in FIGURE 7. A shaft 52 is mounted for rotation in the opening 44. The handle 54 is connected to one end of the shaft 52 for manual rotation thereof and the pinion 56 is secured to the shaft in the pocket 48 and engages the rack 58 which is connected for movement with the ram 40.

The ram 40 is shaped as shown in cross section in FIGURE 7 to provide the longitudinally extending flat surfaces 60 opposite the pockets 50 in the base 42. Rollers 62 are mounted on the shafts 64 in pockets 50 and engage the surfaces 60. Yoke members 66 extend over the front of the recess 46 and are adjustable relative to the base 42 by the bolts 68. A roller 70 is positioned in the pocket 72 on the shaft 74 in each yoke 66 and is in engagement with the ram 40 within the recess 76 in the yokes 66, again as shown in FIGURE 7. A cover 78 is secured to the yokes 66 by convenient means, such as the screws 80. Thus, the ram 40 is mounted for movement through the ram structure 12 in contact with the rollers 62 and 70 at three points which form a triangle support for the ram on rotation of the pinion 56.

The weight of the ram 40 is counterbalanced by the adjustable spring structure 82, including the coil spring 84, the inner end of which is secured to the shaft 52 and the outer end of which is secured to a rod 86 carried by a cup-shaped member 88 having the radially inwardly extending flange 90. A sleeve 92 having the radially outwardly extending flange 94 is secured to the base 42 between the spring 84 and cup-shaped member 88. The spring 96 is positioned between the flanges 90 and 94 and urges the pin 98 into one of a plurality of angularly spaced apart openings 102 in base 42.

Thus, in operation, a counterbalancing force on the ram 40 is determined by the spring 84 which may be adjusted by pulling the cup-shaped member 88 outwardly away from the base 42 to disengage the pin 98 from the openings 102 and rotating the cup-shaped member 88 to which the rod 86 is secured to wind or unwind the spring 84. The cup-shaped member is then released so that the spring 96 urges the pin 98 back into one of the openings 102 to fix the spring tension.

The ram 40 may then be driven up or down under the proper spring counterbalancing guided by the rollers 62 and 70. Should the ram 40 or rollers 70 or 62 wear or otherwise become out of alignment, ready adjustment of the ram relative to the base may be accomplished by means of the bolts 68 which adjust the yokes 66 and their associated rollers 70.

The modified ram structure illustrated in FIGURE 8 is similar in all respects to that illustrated in FIGURES 4 through 6, except the rollers 70 and pocket 72 have been replaced by a nylon plate 106 which may be adjusted to apply variable pressure to the ram 40 by the springs 108 and setscrews 110.

The quick-change tool 14 of FIGURES 2 and 3 includes the base plate 112 having a dovetail portion 114 and an opening 116 extending axially therethrough. The tool body 118 is rotatably secured to the base plate 112 by means of the stub shaft 120 rigidly secured thereto which shaft is rotatably mounted in the bearings 122 secured in the base plate 112. In addition, the shaft 120 is connected at the upper end thereof, as shown in FIGURE 2, to one end of the coil spring 124. The other end of the coil spring 124 is secured to the pin 126 located in the enlarged diameter portion 128 of the opening 116 in the base plate 112.

The body 118 of the quick-change tool 14 has an opening 130 extending transversely therethrough in which the cam follower shaft 132 is rotatably mounted in bearings 134. As shown, the circular electrode disc 36 having teeth portions 138 projecting radially from the periphery thereof is secured to the body of the tool 14 by convenient means, such as the bolt 140 and the pin 142.

Immediately adjacent the quick-change tool 14 a vertical cam surface 144 is provided on the cam member 146 supported on the cam supporting frame 148.

Thus, in operation, when it is desired to machine arcuate axially extending internal grooves 150, for example, in a cylindrical workpiece 38, the electrode 36 is secured to the body 118 of the tool 14. The tool 14 is secured to the dovetail platen 34 of the electrical machining apparatus mechanical section 10, as illustrated in FIGURE 1, with the electrode 36 centered over the workpiece 38 in the dielectric tank 24. The cam member 146 is secured to the frame 148 with the upper part of the cam surface 144 in engagement with the cam follower shaft 132. Electrical discharge machining is then conducted as in the past with the ram 40 being driven down by the usual servo structure (not shown) or manually.

In the downward movement of the ram 40, the body member 118 of the tool 14 will be rotated about the axis of the shaft 120 in opposition to the bias applied thereto through the spring 124 in accordance with the cam surface 144. Rotation of the electrode 36 in its normal downward movement will produce the desired axially extending arcuate grooves in the inner surface of the cylindrical workpiece 38, as shown in FIGURE 2.

The quick-change tool 16 illustrated in FIGURE 4 will enable a helical passage to be produced in a workpiece by electrical discharge machining. The tool 16 may be secured to the dovetail platen 34, as before, by means of the dovetail portion 152 of the base plate 154. The portion 156 of the tool 16 for producing a selected rotary motion of the helical electrode 158 and a predetermined simultaneous axial movement of the electrode is substantially the same as the milling and grinding machine disclosed in the Umbdenstock Patent No. 2,375,052. It will not therefore be considered in detail.

The tool 16 differs from the milling and grinding machine of Umbdenstock in that since no back pressure is present in electrical machining, friction engagement has been provided between the driving wheel 160 and slide 162 and between the slide 164 and the driven wheel 166 in place of the rack and pinion teeth of Umbdenstock. Additionally a servomotor 168 has been provided on the guide 171 which servomotor is driven in accordance with the spacing of the spark gap while such drive is removed from the ram 40. Also, with the tool 16 the servomotor 168 is mounted in a slide 172 and is connected to a piston and cylinder construction 174 by means of the piston rod 176.

In use, to machine a helical opening through a conductive workpiece, the angle of the slide 162 is set to correspond to the pitch of the electrode 158 so as to provide the required combined and simultaneous downward and rotating movement of the electrode 158 on rotation of the drive wheel 160 by the servo motor 168 connected across the gap between the electrode 158 and a conductive workpiece. The motor 168 is energized and electrical machining is accomplished in the usual manner.

In addition, the piston and cylinder structure 174 may be actuated by convenient means (not shown) to move the servo motor 168 to the left in FIGURE 4, whereby the bevelled end 178 of the wheel 160 is caused to engage the bevelled end 180 of the tool member 182 which is secured to the upper end of the shaft 184 for rotation therewith to produce continuous rotation of the shaft 184. This leftward movement of the driving wheel 160 disengages the wheel from the slide 162. In addition, the slide 164 is provided with a portion at the end thereof corresponding to the axially downward limiting position which will not frictionally engage the driven wheel 166 but which will hold the driven wheel in a predetermined axial position.

What I claim as my invention is:

1. A tool for use with electrical machining apparatus comprising base plate means for securing the tool to the machining apparatus, a tool body member, means for securing the tool body member to the tool base plate for rotation about an axis therethrough including a mounting shaft connected to the tool body member extending into the tool base plate and bearings mounted in the tool base plate receiving the mounting shaft for rotation of the body member relative to the base plate, means for releasably securing an electrode to the body member, cam follower shaft means secured to the body member and extending transversely of the axis of rotation thereof relative to the base plate means, cam means positioned adjacent the body member and engaged with the cam follower shaft means, and means for urging the cam follower shaft means into engagement with the cam means whereby the body member and an electrode secured thereto are rotated in accordance with the contour of the cam means on movement of the tool in the direction of the axis of rotation of the tool body member.

2. Structure as set forth in claim 1, wherein the means for urging the cam follower shaft into engagement with the cam comprises a helical spring positioned over the mounting shaft and connected to the mounting shaft at one end and to the base plate at the other end.

3. Structure as set forth in claim 1, wherein the cam follower shaft is rotatably mounted in the body member.

4. Structure as set forth in claim 1, wherein the body member is cylindrical and is rotatable with respect to the base plate about the axis of generation thereof and the means for securing an electrode to the body member comprises an axially extending threaded opening in one end of the cylindrical body member for receiving a mounting bolt and a locating pin secured in the one end of the body member and extending therefrom.

5. Structure as set forth in claim 1, wherein the tool base plate includes a dovetail portion whereby the tool may be rapidly and accurately secured to the electrical machining apparatus.

6. A tool for use with electrical machining apparatus comprising base plate means for securing the tool to the machining apparatus, a tool body member secured to the base plate means for rotation about an axis therethrough, means for releasably securing an electrode to the body member, cam follower shaft means secured to the body member and extending transversely of the axis of rotation thereof relative to the base plate means, cam means positioned adjacent the body member and engaged with the cam follower shaft means, and means for urging the cam follower shaft means into engagement with the cam means including a helical spring connected at one end to the tool body member concentric with the axis of rotation thereof and connected to the base plate at the other end thereof.

7. A tool for use with electrical machining apparatus comprising base plate means for securing the tool to the machining apparatus, a tool body member secured to the tool base plate means for rotation about an axis therethrough, means for releasably securing an electrode to the body member, cam follower shaft means rotatably mounted in the body member and extending transversely of the axis of rotation thereof relative to the base plate means, cam means positioned adjacent the body member and engaged with the cam follower shaft means, and means for urging the cam follower shaft means into engagement with the cam means whereby the body member and an electrode secured thereto are rotated in accordance with the contour of the cam means on movement of the tool in the direction of the axis of rotation of the tool body member.

8. A tool for use with electrical machining apparatus comprising base plate means for securing the tool to the machining apparatus, a cylindrical tool body member secured to the tool base plate means for rotation with respect to the base plate about the axis of generation of the body member, means for releasably securing an electrode to the body member including an axially extending threaded opening in one end of the cylindrical body member for receiving a mounting bolt and a rotating pin secured in the one end of the body member and extending therefrom, cam follower shaft means secured to the body member and extending transversely of the axis of rotation thereof relative to the base plate means, cam means positioned adjacent the body member and engaged with the cam follower shaft means, and means for urging the cam follower shaft means into engagement with the cam means whereby the body member and an electrode secured thereto are rotated in accordance with the contour of the cam means on movement of the tool in the direction of the axis of rotation of the tool body member.

References Cited

UNITED STATES PATENTS

| | | | |
|---|---|---|---|
| 2,278,104 | 3/1942 | Harter | 219—86 |
| 2,539,439 | 1/1951 | Kumler. | |
| 2,773,968 | 12/1956 | Martellotti et al. | |
| 2,375,052 | 5/1945 | Umbdenstock | 51—225 |
| 2,650,979 | 9/1953 | Teubner. | |
| 3,349,214 | 10/1967 | Vuilleumier. | |

JOSEPH V. TRUHE, Primary Examiner

R. F. STAUBLY, Assistant Examiner